(12) United States Patent
Funakoshi et al.

(10) Patent No.: US 6,791,830 B2
(45) Date of Patent: Sep. 14, 2004

(54) INPUT DEVICE

(75) Inventors: Katsuya Funakoshi, Shinagawa (JP);
Takashi Arita, Shinagawa (JP);
Masayuki Kato, Shinagawa (JP)

(73) Assignee: Fujitsu Takamisawa Component Ltd., Tokyo (JP)

( * ) Notice: Subject to any disclaimer, the term of this patent is extended or adjusted under 35 U.S.C. 154(b) by 551 days.

(21) Appl. No.: 09/863,246

(22) Filed: May 24, 2001

(65) Prior Publication Data

US 2002/0054022 A1 May 9, 2002

(30) Foreign Application Priority Data

Nov. 7, 2000 (JP) ........................................ 2000-339576

(51) Int. Cl.⁷ ............................................... H05K 1/00
(52) U.S. Cl. ........................ 361/686; 361/683; 361/680; 361/748
(58) Field of Search ................................ 361/160, 683, 361/152, 115, 686, 680, 748

(56) References Cited

U.S. PATENT DOCUMENTS 5,664,097 A * 9/1997 Johnson et al. ............. 713/200
5,847,696 A * 12/1998 Itoh et al. .................... 345/163
6,217,377 B1 * 4/2001 Nishizawa ................... 439/553

* cited by examiner

Primary Examiner—Stephen W Jackson
(74) Attorney, Agent, or Firm—Staas & Halsey LLP

(57) ABSTRACT

An input device includes a case, circuit boards, and a support member. The case includes a rib formed therein to extend in a given direction. The circuit boards each include an input part, and are temporarily fastened to the case via the rib in process of assembling the input device. After the circuit boards are temporarily fastened to the case, the support member is fixed to the case so as to support the circuit boards between the support member and the case.

8 Claims, 14 Drawing Sheets

FIG. 12A

| | t0 | t1 | t2 | -------- | tn-2 | tn-1 | tn |
|---|---|---|---|---|---|---|---|
| 3-1 | 80h | 80h | 80h | | 80h | 80h | 80h |
| 3-2 | 80h | 72h | 58h | | 5h | 0h | 0h |
| 3-3 | 80h | 80h | 80h | | 80h | 80h | 80h |
| 3-4 | 80h | 80h | 80h | | 80h | 88h | 102h |

DATA DETECTED BY INPUT DEVICE

FIG. 12B

| | t10 | t11 | t12 | -------- | t1n-2 | t1n-1 | t1n |
|---|---|---|---|---|---|---|---|
| 3-1 | — | — | — | | — | — | — |
| 3-2 | — | — | — | | — | 0h | — |
| 3-3 | — | — | — | | — | — | — |
| 3-4 | — | — | — | | — | 88h | 102h |

DATA TRANSMITTED TO COMPUTER

INPUT DEVICE

BACKGROUND OF THE INVENTION

1. Field of the Invention

The present invention generally relates to input devices, and more particularly to an input device for performing an input operation for moving a three-dimensional (3D) model in a desired direction.

2. Description of the Related Art

Recently, 3D graphics has been frequently employed in the field of computer graphics. Therefore, there is a demand for an input device facilitating 3D graphics.

A mouse is a common input device for a computer. Operations in two axial directions are performed by moving the mouse on a flat surface. On the other hand, in order to operate a 3D graphics image, it is necessary to perform operations in six axial directions. Conventionally, a 3D graphics image has been operated by switching between axes to be operated if the mouse is employed to operate the 3D graphics image.

However, a conventional input device such as a mouse is generally for operations in X-axis and Y-axis directions, and is prevented from freely operating the 3D graphics image having the six axial operational directions.

SUMMARY OF THE INVENTION

It is a general object of the present invention to provide an input device in which the above-described disadvantage is eliminated.

A more specific object of the present invention is to provide a low-cost, well-assembled input device having good operability.

The above objects of the present invention are achieved by an input device including: a case including a rib formed therein to extend in a given direction; circuit boards each including an input part, the circuit boards being temporarily fastened to the case via the rib in process of assembling the input device; and a support member which is fixed to the case so as to support the circuit boards between the support member and the case after the circuit boards are temporarily fastened to the case.

According to the above-described input device, the case can be formed by using a pair of inner and outer metal molds. This lowers the production cost of the metal molds compared with a case requiring a larger number of metal molds, and increases the production efficiency of the case, thus allowing the whole input device to be produced at low cost.

The above objects of the present invention are also achieved by an input device having input parts, which device includes a control part which outputs data input from one of the input parts after a passage of a given period of time if the one of the input parts is operated within the given period of time, and outputs data input from two or more of the input parts after a passage of a given period of time if the two or more of the input parts are operated within the given period of time.

The input device having the above-described structure causes a host computer to have only to process the data as supplied from the input device without distinguishing a case where only one of the input parts is operated from a case where two or more of the input parts are operated at the same time. This reduces a processing load on the host computer.

BRIEF DESCRIPTION OF THE DRAWINGS

Other objects, features and advantages of the present invention will become more apparent from the following detailed description when read in conjunction with the accompanying drawings, in which:

FIGS. 12A and 12B are diagrams for illustrating the operation of the MPU;

DETAILED DESCRIPTION OF THE PREFERRED EMBODIMENTS

A description will now be given, with reference to the accompanying drawings, of an embodiment of the present invention.

Figure 1:
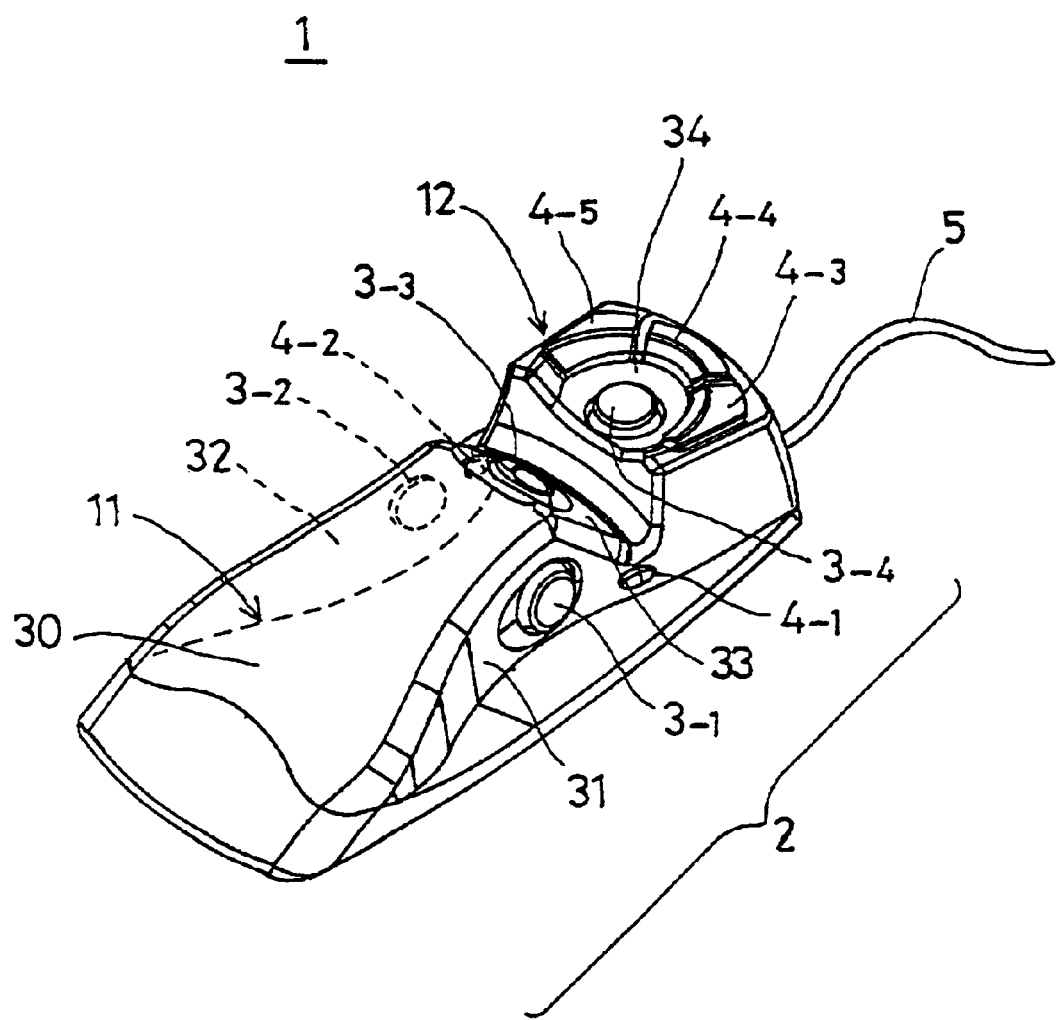
FIG. 1 is a perspective view of an input device according to an embodiment of the present invention.
Figure 2:
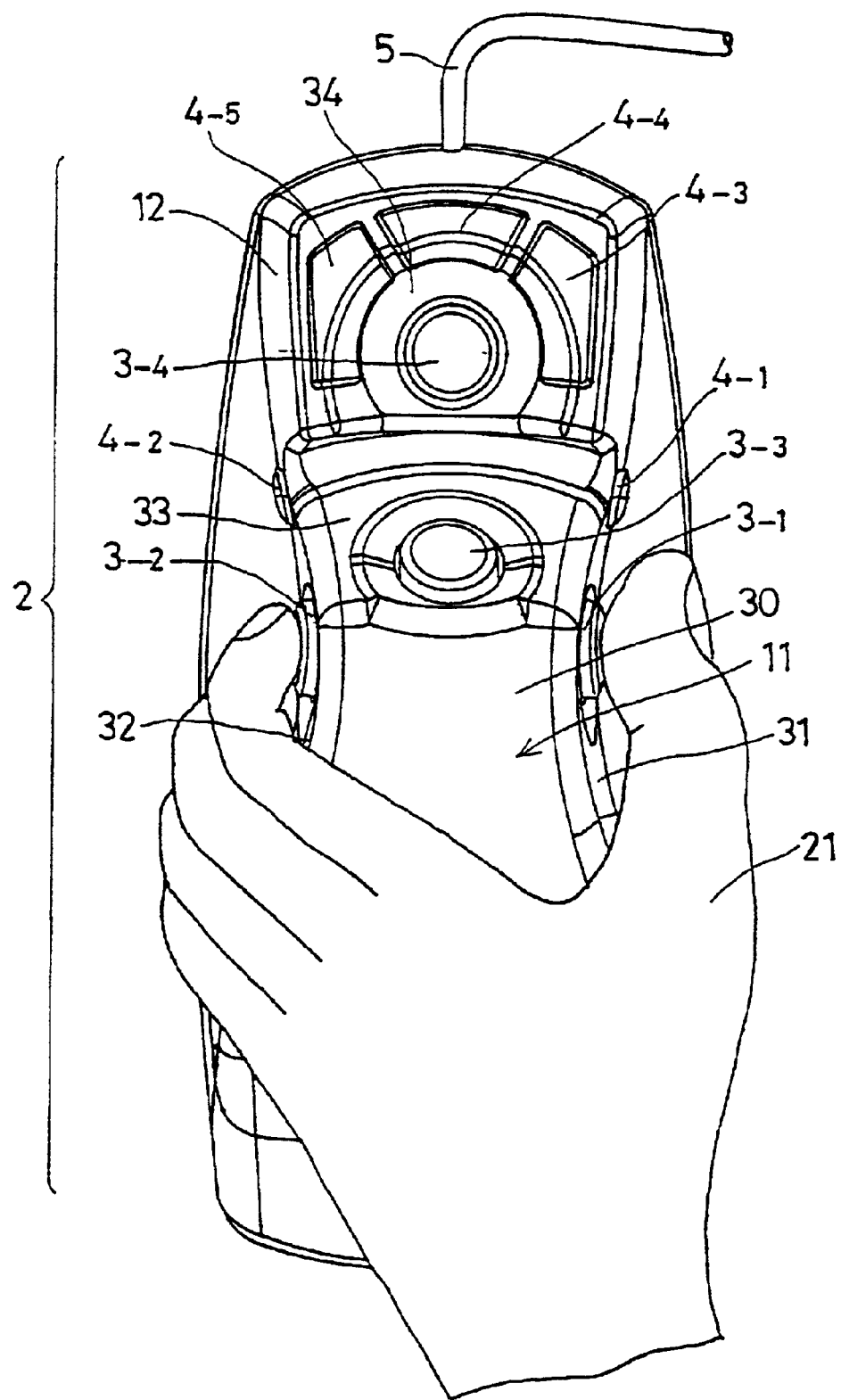
FIG. 2 is a top plan view of the input device in use.

FIG. 1 is a perspective view of an input device 1 according to the embodiment of the present invention. FIG. 2 is a top plan view of the input device 1 in use.

The input device 1 includes a main body 2 and a cable 5. The main body 2 is connected via the cable 5 to a computer performing operations. The main body 2 includes a palm rest part 11 and an operation part 12.

A hand 21 of an operator is placed on a rear slope 30 of the palm rest part 11 as shown in FIG. 2. The palm rest part 11 has a first operation lever (input part) 3-1 and a first switch (input part) 4-1 provided on a right side 31 thereof. The palm rest part 11 has a second operation lever 3-2 and a second switch 4-2 provided on a left side 32 thereof. Further, the palm rest part 11 has a third operation lever 3-3 provided on a front slope 33 thereof.

The operation part 12 is formed to be joined to the front slope 33 of the palm rest part 11. The operation part 12 has a fourth operation lever 3-4 and third through fifth switches 4-3 through 4-5 provided on an upper surface 34 thereof. A 3D graphics image can be moved or rotated by operating the first through fourth operation levers 3-1 through 3-4.

Figure 3:
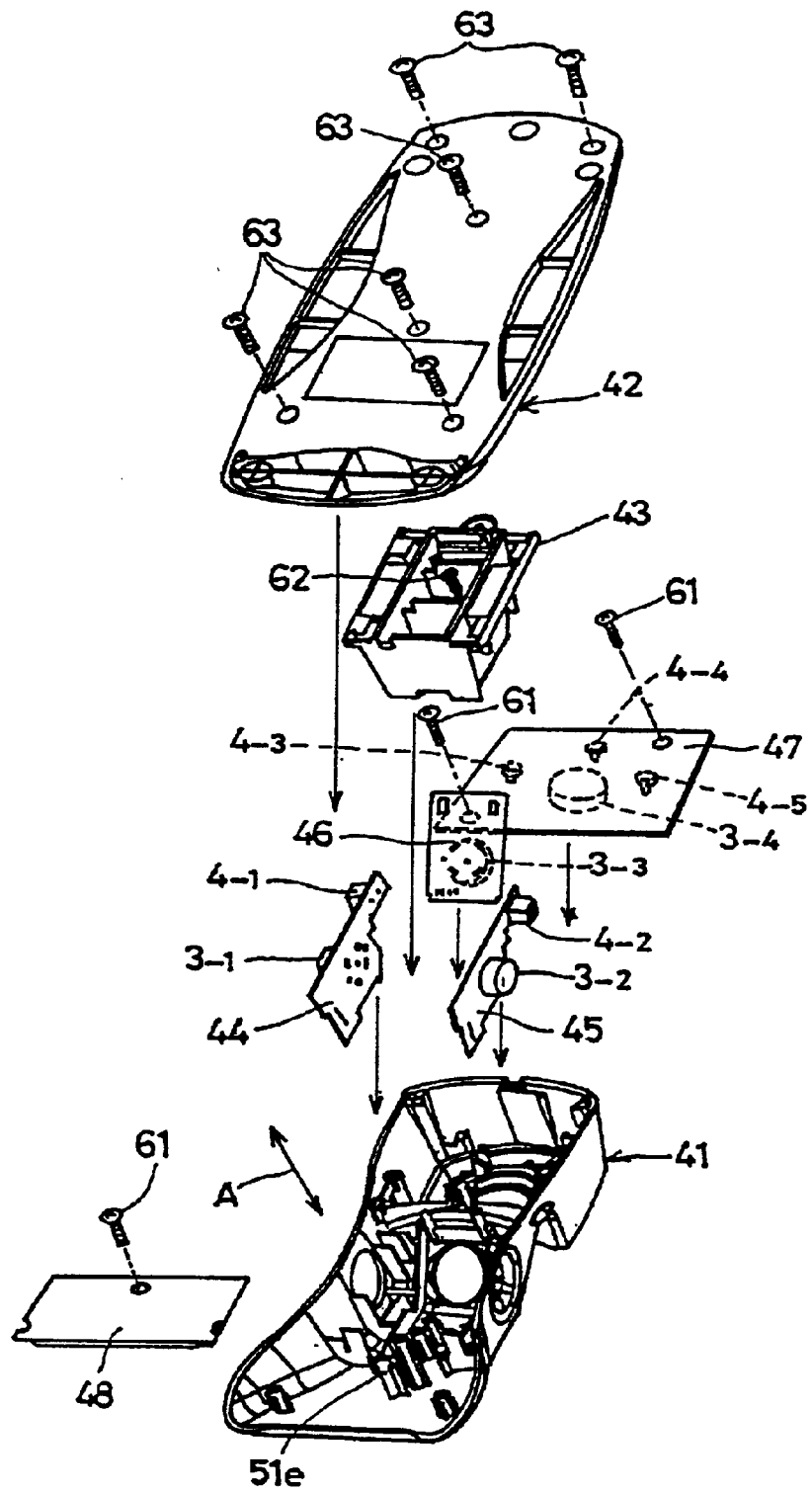
FIG. 3 is an exploded perspective bottom view of a main body of the input device.
Figure 4:
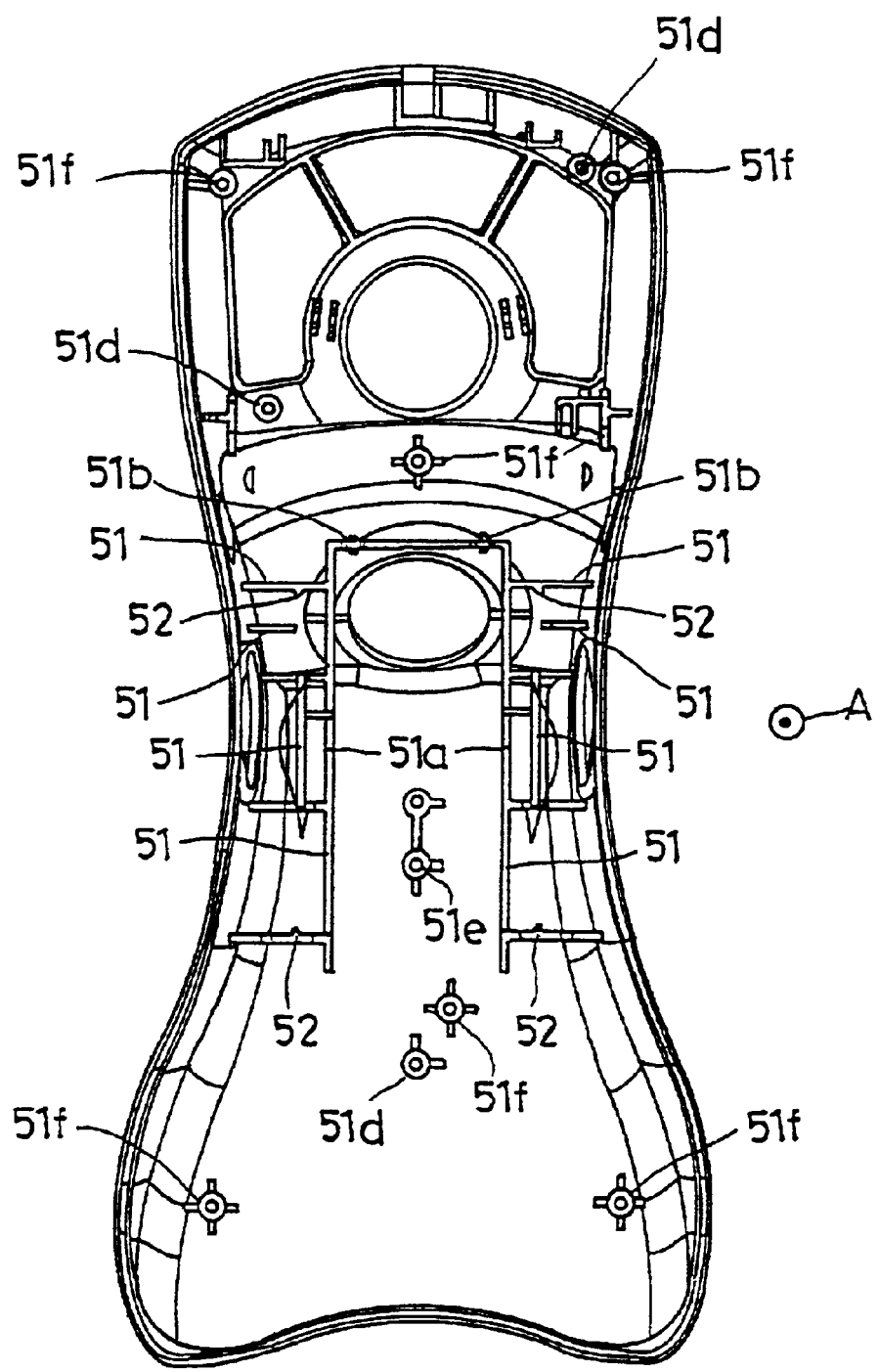
FIG. 4 is a diagram showing an inside of an upper case of the main body.

FIG. 3 is an exploded perspective bottom view of the main body 2 of the input device 1, and FIG. 4 is a diagram showing an inside of an upper case 41 of the main body 2.

The main body 2 includes the upper case 41, a lower case 42, a support member 43, and circuit boards 44 through 48.

The circuit board 44 has the first operation lever 3-1 and the first switch 4-1 mounted thereon. The circuit board 45 has the second operation lever 3-2 and the second switch 4-2 mounted thereon. The circuit board 46 has the third operation lever 3-3 mounted thereon. The circuit board 47 has the fourth operation lever 3-4 and the third through fifth switches 4-3 through 4-4 mounted thereon. The circuit board 48 has a processing circuit such as an MPU (microprocessing unit) mounted thereon.

The circuit boards 44 through 46 are temporarily fastened to the upper case 41 by a rib 51 and claw parts 52 formed inside the upper case 41. The rib 51 is formed to extend in a direction indicated by arrow A (an A direction) in FIG. 3, which direction is substantially perpendicular to the opening surface of the upper case 41.

The upper case 41 having the above-described structure can be formed by using a pair of inner and outer metal molds. This lowers the production cost of the metal molds compared with a case requiring a larger number of metal molds, and increases the production efficiency of the upper case 41, thus allowing the whole input device 1 to be produced at low cost.

A description will now be given of a method of attaching the circuit boards 44 through 48 to the upper case 41.

FIGS. 5 through 8B are diagrams for illustrating the method.

The circuit board 44 has a lower end 44a, and upper and lower longitudinal ends 44b and 44c. Each of the upper longitudinal ends 44b includes a portion protruding from the circuit board 44 in a longitudinal direction thereof.

Figure 5:
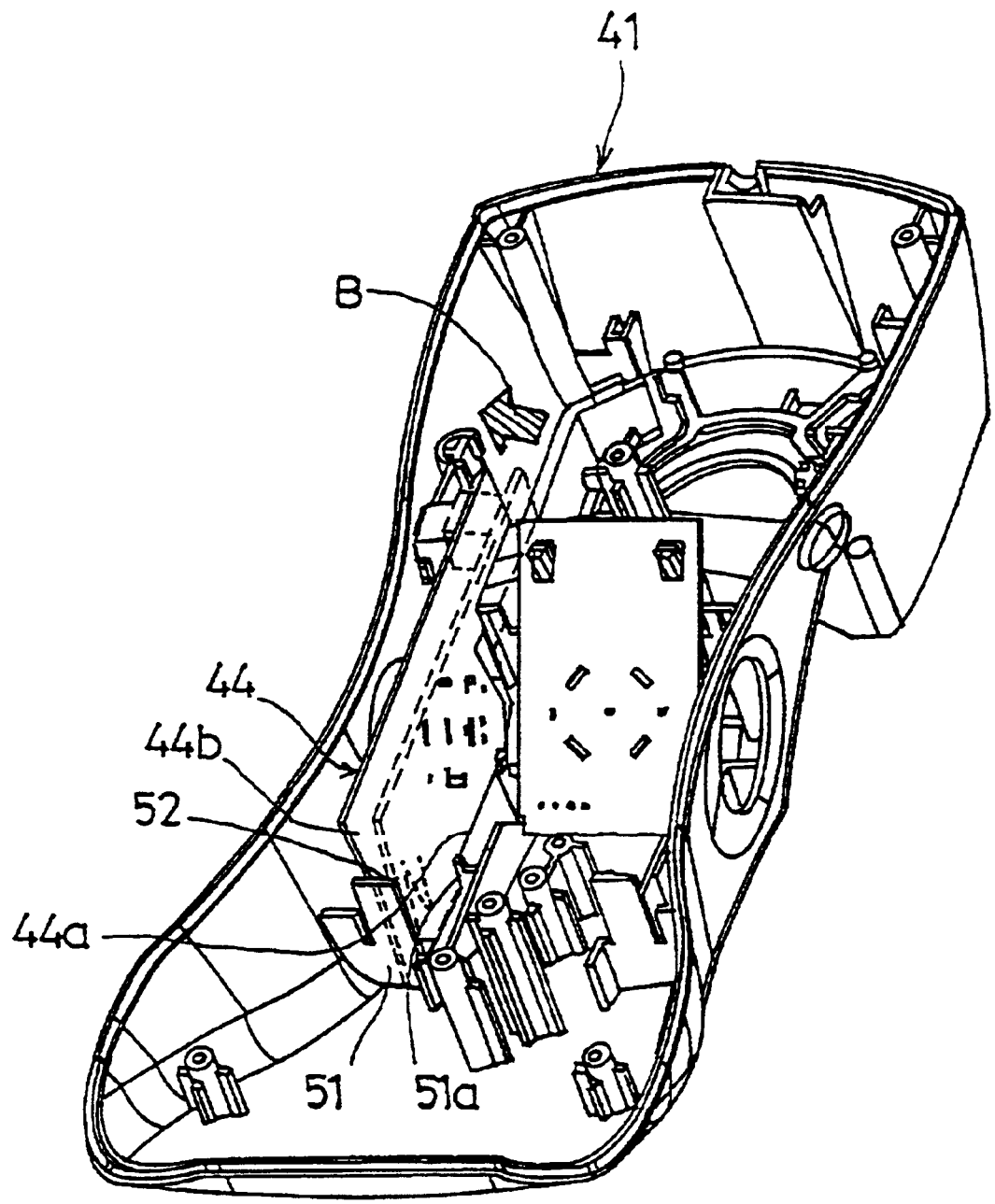
FIGS. 5 through 8B are diagrams for illustrating a method of attaching circuit boards to the upper case.
Figure 6:
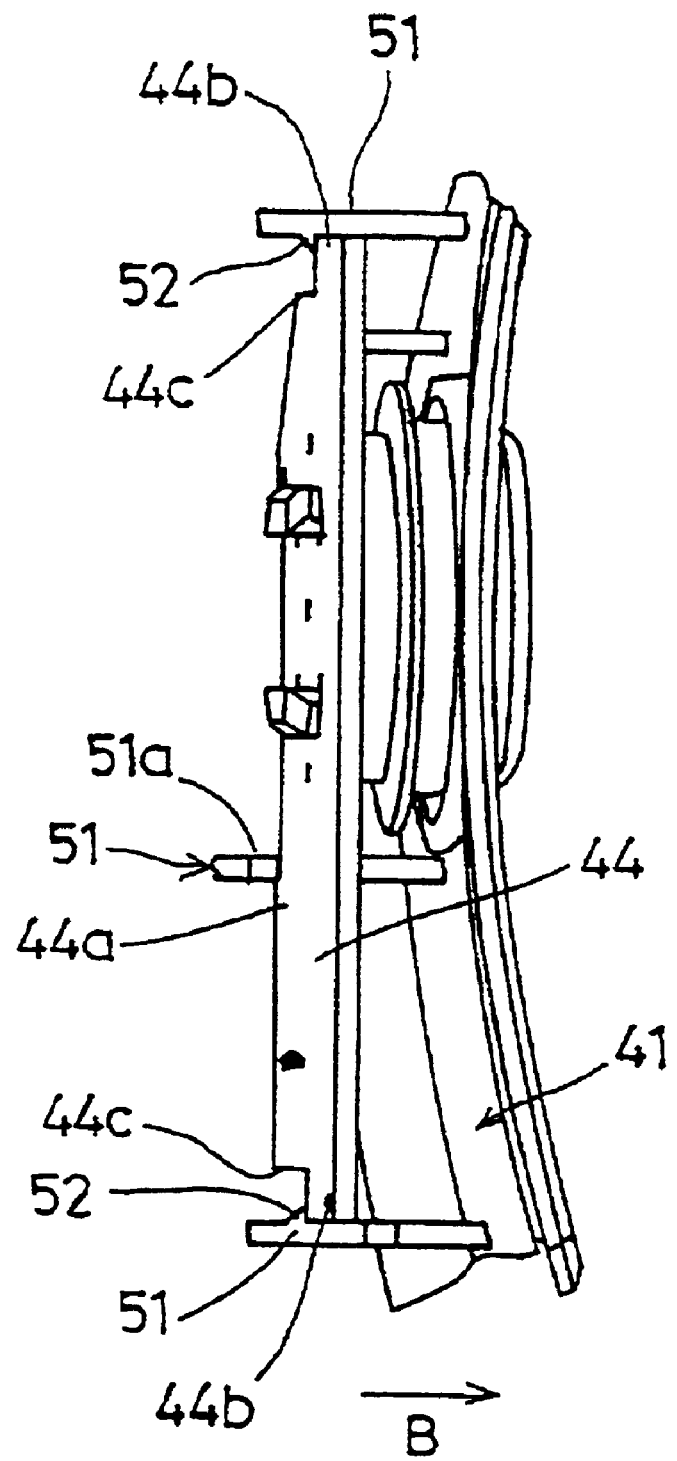

In order to fasten the circuit board 44 temporarily to the upper case 41, as shown in FIGS. 5 and 6, the lower end 44a of the circuit board 44 is engaged with a convex part 51a formed on the rib 51, and then the circuit board 44 is rotationally moved in a direction indicated by arrow B (a B direction) in FIG. 5 around the lower end 44a. By this rotational movement, upper longitudinal ends 44b of the circuit board 44 contact the respective claw parts 52 formed on the rib 51. Thereafter, by rotationally moving the circuit board 44 further in the B direction, the upper longitudinal ends 44b pass over the respective claw parts while the lower longitudinal ends 44c escape from the claw parts 52, so that the circuit board 44 is temporarily fastened to the upper case 41.

The circuit board 45, which has the same structure as the circuit board 44, is temporarily fastened to the upper case 41 in the same manner as the circuit board 44.

Figure 7:
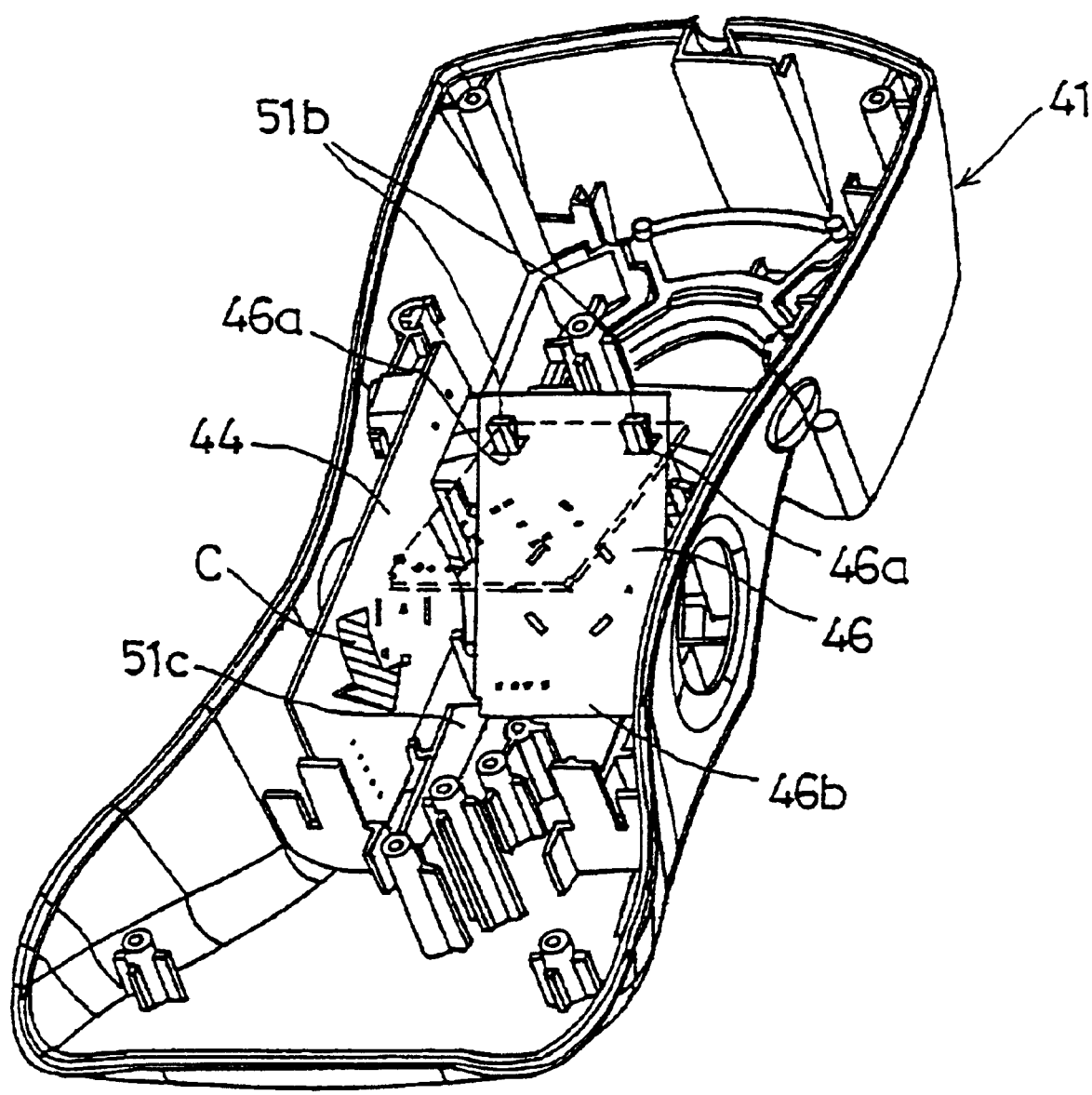
Figure 8A:
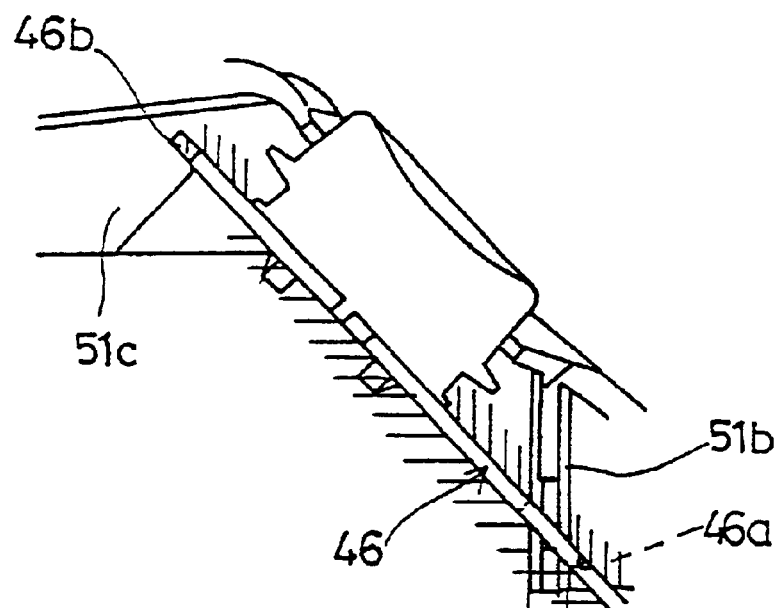
Figure 8B:
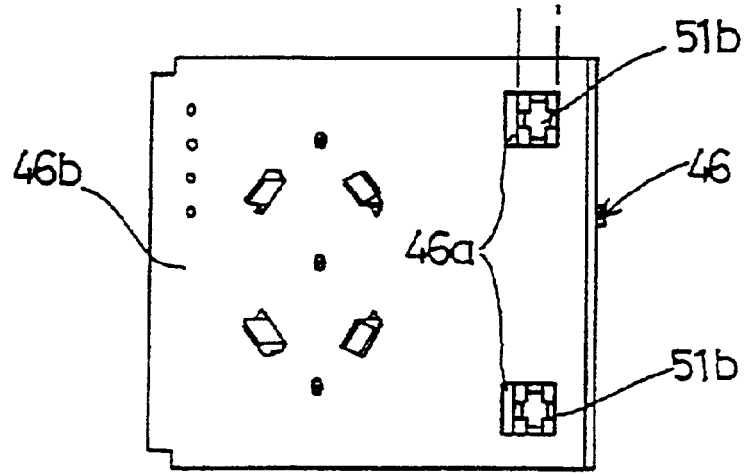

In order to temporarily fasten the circuit board 46 to the upper case 41, first, protruding parts 51b of the rib 51 are fitted into holes 46a formed in the upper portion of the circuit board 46 as shown in FIGS. 7 through 8B. Next, the circuit board 46 is rotationally moved in a direction indicated by arrow C in FIG. 7 with the holes 46a serving as fulcrums. By this rotational movement of the circuit board 46, a lower end 46b of the circuit board 46 is engaged with step portions 51c formed on the rib 51, so that the circuit board 46 is temporarily fastened to the upper case 41.

As previously described, the circuit boards 44 through 46 are temporarily fastened to the upper case 41, being slanted with respect to the A direction in which the rib 51 extends.

Figure 9:
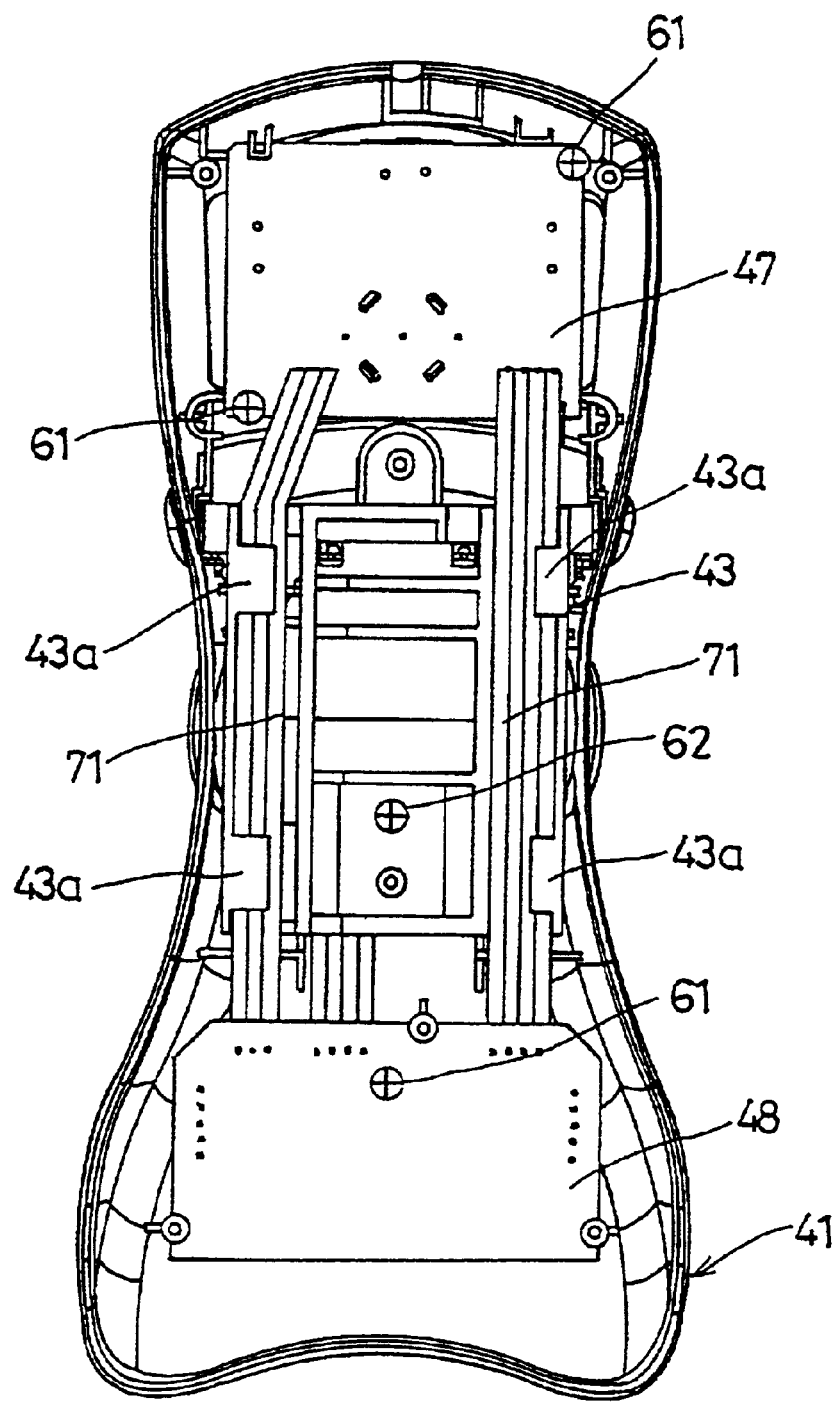
FIG. 9 is a diagram showing the inside of the upper case to which the circuit boards are fixed.

FIG. 9 is a diagram showing the inside of the upper case 41 to which the circuit boards 44 through 48 are fixed.

As shown in FIG. 9, the circuit boards 47 and 48 are fixed to the upper case 41 with screws 61 being threaded into ribs 51d.

After the circuit boards 44 through 46 are temporarily fastened to the upper case 41, the support member 43 is fixed to the upper case 41 by threading a screw 62 into a rib 51e. The support member 43 includes opposed first and second side faces that are slanted according to angles at which the circuit boards 44 and 45 are fastened to the upper case 41, respectively. The support member 43 further includes a rear face that is slanted according to an angle at which the circuit board 46 is fastened to the upper case 41. The circuit boards 44 through 46 are fixed in slanted states between the upper case 41 and the first side face, the second side face, and the rear face of the support member 43, respectively.

The circuit boards 44 through 47 are connected to the circuit board 48 by cables 71. Upon receiving operation signals from the circuit boards 44 through 47, the circuit board 48 performs a below-described operation and transmits generated data to the computer via the cable 5. The computer supplies power to the input device 1 via the cable 5, and the input device 1 is actuated by the power.

The support member 43 includes a bottom surface on which claw parts 43a for supporting the cables 71 are formed to secure the attachment of and prevent the disconnection of the cables 71.

As shown in FIG. 9, the lower case 42 is attached to the upper case 41 by threading screws 63 shown in FIG. 3 into ribs 51f after the circuit boards 44 through 48 and the support member 43 are attached. Thus, the input device 1 is assembled.

Next, a description will be given of an operation detection operation.

Figure 10:
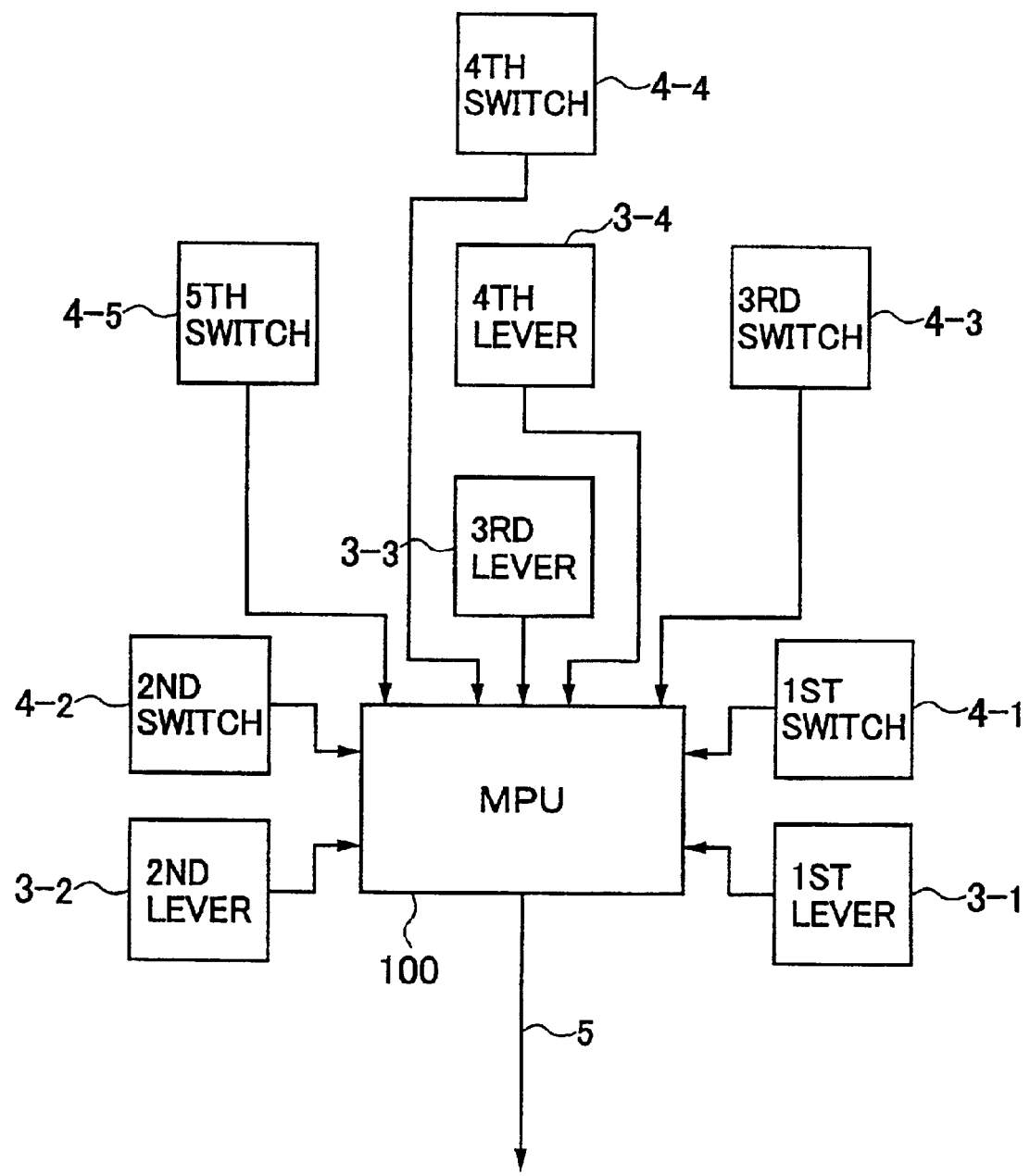
FIG. 10 is a block diagram showing connections between an MPU and respective operation levers and switches according to the embodiment of the present invention.

FIG. 10 is a block diagram showing connections between an MPU 100 (control part) and the respective first through fourth operation levers 3-1 through 3-4 and first through fifth switches 4-1 through 4-5 according to the embodiment of the present invention. The MPU 100 generates data based on signals supplied from the respective first through fourth operation levers 3-1 through 3-4 and first through fifth switches 4-1 through 4-5, and supplies the generated data to the computer via the cable 5.

Figure 11:
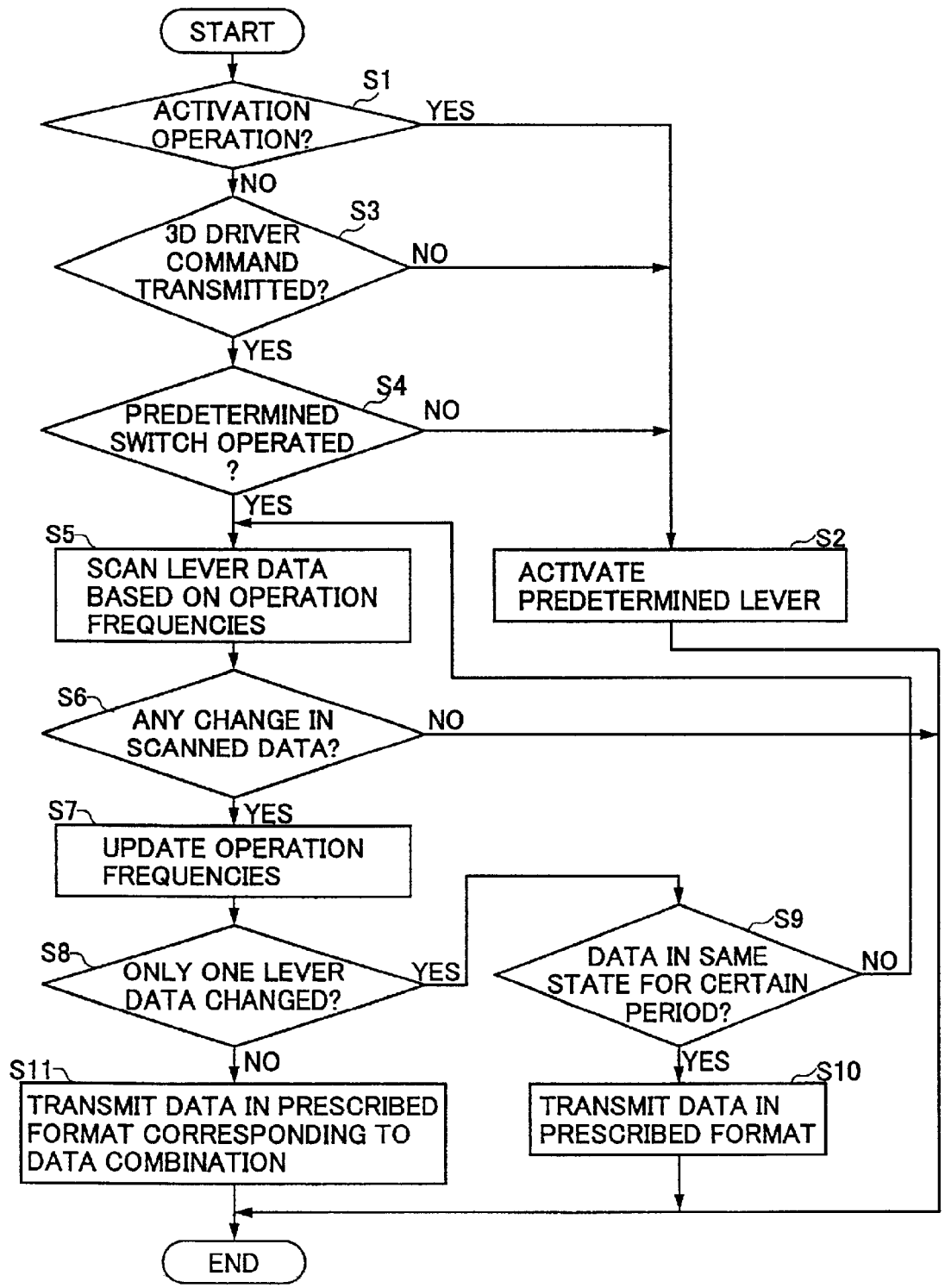
FIG. 11 is a flowchart of an operation of the MPU according to the embodiment of the present invention.

FIG. 11 is a flowchart of an operation of the MPU 100 according to the embodiment of the present invention.

First, in step S1, it is determined whether an operation performed in the input device 1 is an activation operation. If it is determined in step S1 that the operation is the activation operation, in step S2, the input device 1 activates a predetermined one of the first through fourth operation levers 3-1 through 3-4, for instance, the fourth operation lever 3-4, so as to operate as a conventional mouse. If it is not determined in step S1 that the operation is the activation operation, in step S3, it is determined whether a command indicating the presence of a driver enabling the operation of a 3D graphics image is transmitted from the computer. If it is not determined in step S3 that the command is transmitted, the operation proceeds to step S2 to maintain the state in which only the fourth operation lever 3-4 is activated.

If it is determined in step S3 that the command is transmitted, in step S4, it is determined whether a predetermined one of the first through fifth switches 4-1 through 4-5, for instance, the first switch 4-1, is operated to activate the first through fourth operation levers 3-1 through 3-4 so that a 3D graphics operation is enabled.

If it is determined in step S4 that the predetermined first switch 4-1 is operated, in step S5, the MPU 100 first scans first through fourth data transmitted from the first through fourth operation levers 3-1 through 3-4, respectively. In step 5, the power is turned on and off right before and after the scanning, respectively, so that power consumption is reduced.

Then, the MPU 100 stores the operation frequencies of the respective first through fourth operation levers 3-1 through 3-4 so as to adjust the scanning frequencies of the first through fourth data in the scanning of step S5 in accordance with their respective operation frequencies. That is, the more frequently the first through fourth operation levers are operated, the more frequently the first through fourth data are scanned. Further, if a less frequently operated one of the first through fourth operation levers 3-1 through 3-4 is operated, data from the one of the first through fourth operation levers 3-1 through 3-4 is scanned with a higher frequency for a predetermined period of time. As a result, unnecessary scanning operations and power consumption are reduced, and a higher operation speed is achieved.

Next, in step 6, it is determined from the scanning results of step S5 whether the first through fourth data include any change.

If it is determined in step S6 that the first through fourth data includes a change or changes, in step S7, the operation frequencies of the first through fourth operation levers 3-1 through 3-4 are updated.

Next, in step S8, it is determined whether only one of the first through fourth data is changed. If it is determined in step S8 that only one of the first through fourth data is changed, in step S9, it is determined whether the changed one of the first through fourth data remains in the same state for a certain period of time. If it is determined in step S9 that the changed data remains in the same state for a certain period of time, in step S10, the changed data is transmitted to the cable 5 after being formatted into a prescribed format.

If it is not determined in step S8 that only one of the first through fourth data is changed, that is, if it is determined that two or more of the first through fourth data are changed, the changed data are transmitted to the cable 5 after being formatted into a prescribed format corresponding to the combination of the changed data. For instance, if the first and second data from the first and second operation levers 3-1 and 3-2 are changed, it is determined that an operation causing these data changes rotates a 3D graphics image around a Z-axis on a screen, and the changed data are transmitted to the cable 5 in a prescribed format corresponding to the combination of the first and second data. At this point, if the combination of changed data is not included in the predetermined combinations of the first through fourth data, it is determined that an operation causing the data changes is unintentionally performed by the operator so that the changed data are not transmitted.

FIGS. 12A and 12B are diagrams for illustrating the operation of the MPU 100. FIG. 12A shows the first through fourth data from the first through fourth operation levers 3-1 through 3-4, and FIG. 12B shows data transmitted from the cable 5.

In FIGS. 12A and 12B, the second and fourth operation levers 3-2 and 3-4 form a pair.

If the second data from the second operation lever 3-2 is changed from "5 h" to "0 h" and the fourth data from the fourth operation lever 3-4 is changed from "80 h" to "88 h" at a time tn−1 as shown in FIG. 12A, steps S5, S6, S7, S8, and S11 of FIG. 11 are performed so that the second data "0 h" of the second operation lever 3-2 and the fourth data "88 h" of the fourth operation lever 3-4 are output to the cable 5 at a time t1n−1 as shown in FIG. 12B.

Next, if the fourth data from the fourth operation lever 3-4 is changed from "88 h" to "102 h" at a time tn as shown in FIG. 12A, steps S5 through S10 are performed so that the fourth data "102 h" is output to the cable 5 at a time tin as shown in FIG. 12B.

Thus, the computer has only to process the data as supplied from the input device 1 without distinguishing a case where only one of the first through fourth operation levers 3-1 through 3-4 is operated from a case where two of the first through fourth operation levers 3-1 through 3-4 are operated at the same time. This reduces a processing load on the computer.

Figure 13:
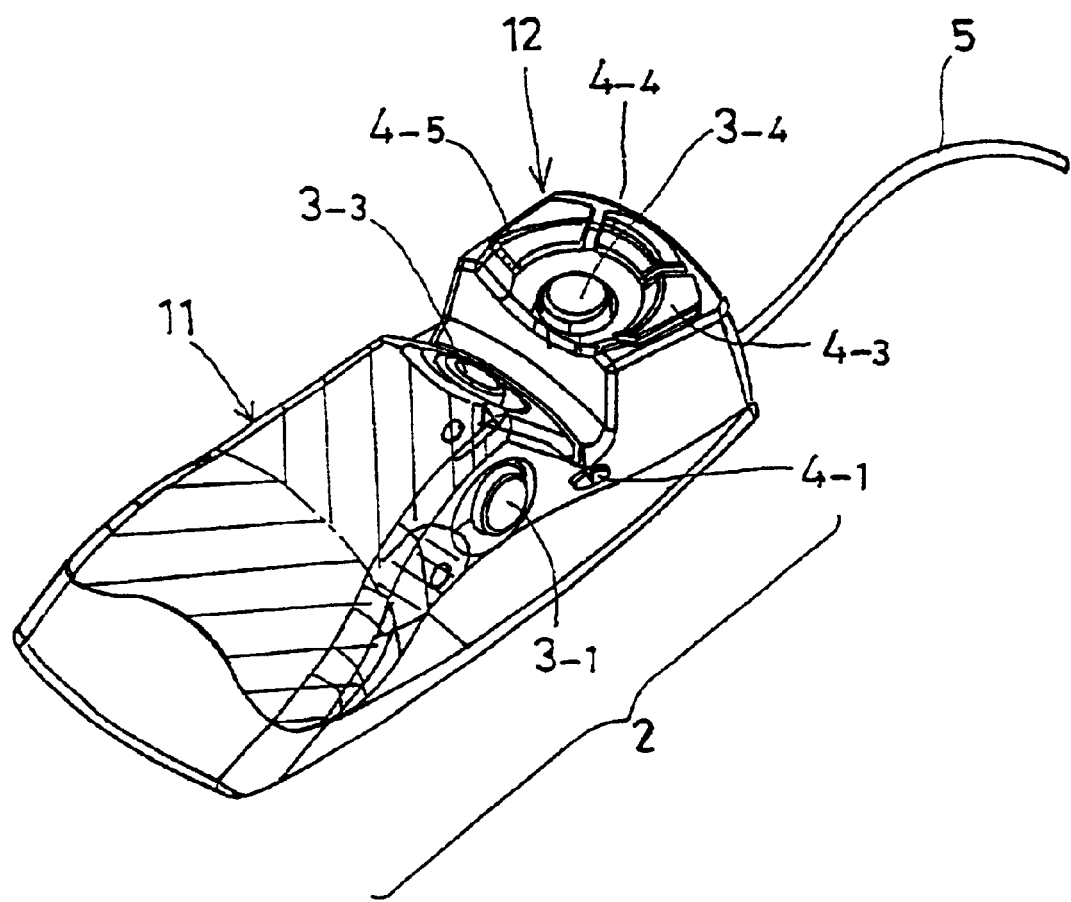
FIG. 13 is a diagram for illustrating an arrangement of switches on the input device.

FIG. 13 is a diagram for illustrating an arrangement of switches on the input device 1.

Although the input device 1 is provided with the first through fifth switches 4-1 through 45 in this embodiment, the input device 1 is allowed to include a larger number of switches. In this case, however, additional switches are provided on an area other than the palm rest part 11 indicated by slashes in FIG. 13 since the hand 21 of the operator is placed thereon.

Figure 14:
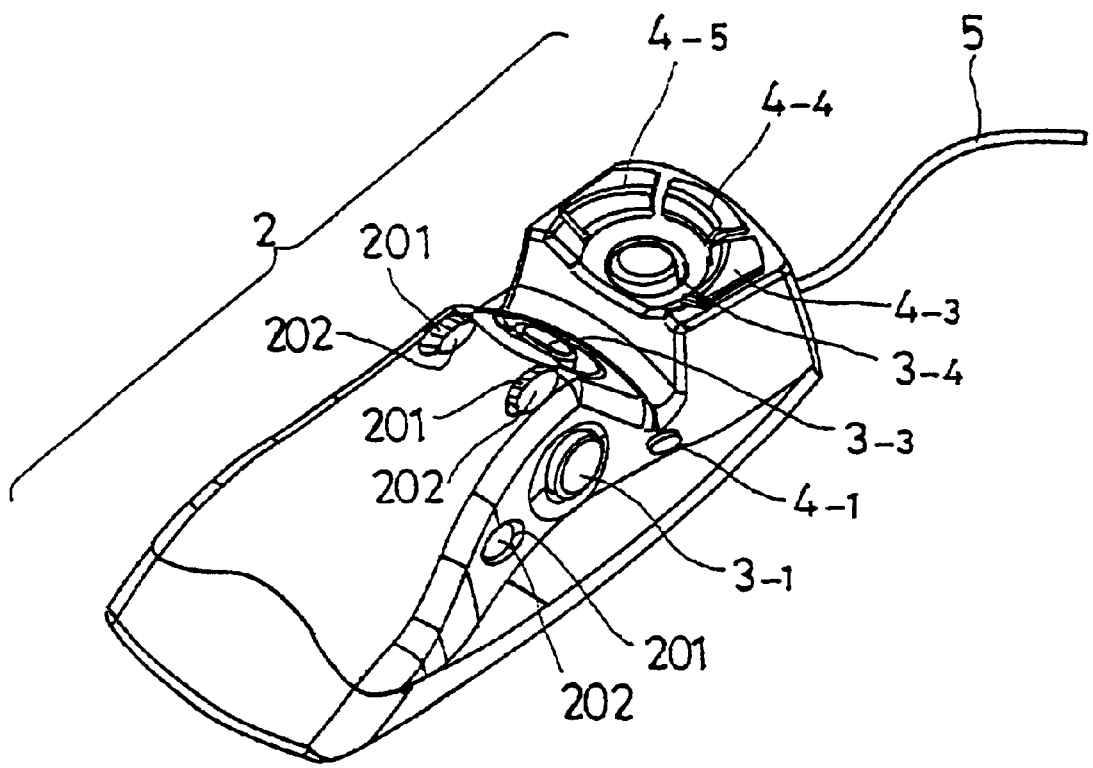
FIG. 14 is a diagram showing a variation of the input device of the embodiment of the present invention.

FIG. 14 is a diagram showing a variation of the input device 1 of the embodiment of the present invention.

If switches 202 are to be provided on the palm rest part 11 of the input device 1, concave parts 201 are formed on the surface of the palm rest part 11 so that the switches 202 are provided therein as shown in FIG. 14. This structure prevents unintentional operations of the switches 202.

The present invention is not limited to the specifically disclosed embodiment, but variations and modifications may be made without departing from the scope of the present invention.

The present application is based on Japanese priority application No. 2000-339576 filed on Nov. 7, 2000, the entire contents of which are hereby incorporated by reference.

What is claimed is:

1. An input device comprising:

a case including a rib formed therein to extend in a given direction;

a plurality of circuit boards each including an input part, the circuit boards being temporarily fastened to said case via the rib in process of assembling the input device; and a support member which is fixed to said case so as to support said circuit boards between the support member and said case after said circuit boards are temporarily fastened to said case, wherein said circuit boards are slanted with respect to the direction in which the rib extends in being temporarily fastened to said case, and are fixed to said case in slanted states by said support member, and wherein each of two of said circuit boards include first and second end portions on first and second parallel sides, and are temporarily fastened to said case with the first end portion engaging the rib and opposed end portions of the second end portion engaging claw parts formed on the rib.

2. An input device comprising:

a case including a rib formed therein to extend in a given direction;

a plurality of circuit boards each including an input part, the circuit boards being temporarily fastened to said case via the rib in process of assembling the input device; and a support member which is fixed to said case so as to support said circuit boards between the support member and said case after said circuit boards are temporarily fastened to said case, wherein one of said circuit boards has holes formed therein, and is temporarily fastened to said case with the holes engaging the rib and a first side of the one of said circuit boards engaging the rib by rotationally moving the one of said circuit boards with the holes serving as fulcrums in a direction reverse to the direction in which the rib extends.

3. An input device comprising:

a case including a rib formed therein to extend in a given direction;

a plurality of circuit boards each including an input part, the circuit boards being temporarily fastened to said case via the rib in process of assembling the input device; and a support member which is fixed to said case so as to support said circuit boards between the support member and said case after said circuit boards are temporarily fastened to said case, wherein said circuit boards are slanted with respect to the direction in which the rib extends in being temporarily fastened to said case, and are fixed to said case in slanted states by said support member, and wherein one of said circuit boards has holes formed therein, and is temporarily fastened to said case with the holes engaging the rib and a first side of the one of said circuit boards engaging the rib by rotationally moving the one of said circuit boards with the holes serving as fulcrums in a direction reverse to the direction in which the rib extends.

4. The input device as claimed in claim 2, wherein:

the one of said circuit boards further includes a second side parallel to the first side thereof; and the holes are formed close to the second side.

5. The input device as claimed in claim 3, wherein:

the one of said circuit boards further includes a second side parallel to the first side thereof; and the holes are formed close to the second side.

6. An input device having input parts, comprising:

a control part which outputs data input from one of the input parts after a passage of a given period of time when the one of when the input parts is operated within the given period of time, and outputs data input from two or more of the input parts after a passage of a given period of time when the two or more of the input parts are operated within the given period of time, wherein said control part detects operation frequencies of the input parts so as to adjust data scanning frequencies thereof in accordance with the operation frequencies.

7. The input device as claimed in claim 6, wherein the data scanning frequencies are adjusted to become higher when the operation frequencies become higher and to become lower when the operation frequencies become lower.

8. The input device as claimed in claim 6, wherein a data scanning frequency of one of the input parts in operation is increased for a certain period of time when the one of the input parts has a low operation frequency compared with a rest of the input parts.

* * * * *